US008262100B2

(12) United States Patent
Thomas

(10) Patent No.: US 8,262,100 B2
(45) Date of Patent: Sep. 11, 2012

(54) VEHICLE HEIGHT ADJUSTMENT SUSPENSION DEVICE

(76) Inventor: Georges Thomas, L'Épiphanie (CA)

( * ) Notice: Subject to any disclaimer, the term of this patent is extended or adjusted under 35 U.S.C. 154(b) by 21 days.

(21) Appl. No.: 12/923,538

(22) Filed: Sep. 28, 2010

(65) Prior Publication Data

US 2012/0074660 A1  Mar. 29, 2012

(51) Int. Cl.
B60G 17/015 (2006.01)
B60G 17/04 (2006.01)
B60G 11/58 (2006.01)
F16F 9/00 (2006.01)

(52) U.S. Cl. ........... 280/5.514; 188/321.11; 267/175; 280/6.157; 280/124.157; 280/124.162

(58) Field of Classification Search ............ 180/218; 188/315, 322.19, 321.11; 267/221, 175, 267/177; 280/5.514, 6.157, 63, 124.157–124.162, 280/124.164, 124.166, 124.167, 124.179
See application file for complete search history.

(56) References Cited

U.S. PATENT DOCUMENTS

| | | | |
|---|---|---|---|
| 2,950,785 A * | 8/1960 | Patriquin | 188/274 |
| 4,422,661 A | 12/1983 | Kawamura | |
| 4,568,101 A | 2/1986 | Bleustein et al. | |
| 4,648,621 A * | 3/1987 | Yokoya et al. | 280/6.157 |
| 4,830,395 A * | 5/1989 | Foley | 280/124.162 |
| 5,009,451 A | 4/1991 | Hayashi et al. | |
| 5,060,959 A * | 10/1991 | Davis et al. | 280/5.514 |
| 5,348,112 A * | 9/1994 | Vaillancourt | 180/227 |
| 5,678,847 A * | 10/1997 | Izawa et al. | 280/5.515 |
| 5,711,390 A | 1/1998 | Hikichi et al. | |
| 7,135,794 B2 | 11/2006 | Kuhnel | |
| 7,364,000 B2 | 4/2008 | Furukawa et al. | |
| 7,364,142 B2 | 4/2008 | Beck | |
| 7,722,056 B2 * | 5/2010 | Inoue et al. | 280/5.512 |
| 7,857,325 B2 * | 12/2010 | Copsey et al. | 280/6.157 |
| 7,922,181 B2 * | 4/2011 | Hakui et al. | 280/6.157 |
| 2002/0089107 A1 * | 7/2002 | Koh | 267/218 |
| 2007/0210539 A1 | 9/2007 | Hakui et al. | |
| 2008/0164111 A1 * | 7/2008 | Inoue et al. | 188/297 |
| 2009/0045595 A1 | 2/2009 | Michel | |
| 2009/0121398 A1 * | 5/2009 | Inoue | 267/140.14 |
| 2009/0146385 A1 | 6/2009 | Michel | |
| 2009/0261542 A1 | 10/2009 | McIntyre | |
| 2010/0025946 A1 * | 2/2010 | Inoue et al. | 280/6.157 |
| 2011/0218707 A1 * | 9/2011 | Inoue et al. | 701/37 |

FOREIGN PATENT DOCUMENTS

EP    1927486 A2    6/2008
JP    60094808 A  *  5/1985

* cited by examiner

Primary Examiner — Paul N Dickson
Assistant Examiner — Laura Freedman
(74) Attorney, Agent, or Firm — Equinox Protection; Franz Bosang, Patent Agent

(57) ABSTRACT

A vehicle height adjustment suspension device provides for both automatic and selective raising and lowering of a supported portion of a vehicle frame relative a ground surface, while also providing shock absorption. The device includes a suspension assembly for absorbing shocks mounted on a rotatable threaded screw connected to a motor and extending into the suspension assembly. The assembly may be extended and retracted on the screw by rotating the screw in first and second directions to raise and lower the supported portion while the shock absorber assembly simultaneously provides shock absorption capability.

20 Claims, 7 Drawing Sheets

VEHICLE HEIGHT ADJUSTMENT SUSPENSION DEVICE

FIELD OF THE INVENTION

The present invention relates to height adjustments for motorized vehicles, and is more directly concerned with a height adjustment device connected to the vehicle suspension device.

BACKGROUND OF THE INVENTION

Devices for elevating and lowering a vehicle, or a desired supported portion thereof, relative to a ground surface are well known in the art. In their most basic form, such devices consist of well known shock absorber assemblies or telescopic forks, often deployed in conjunction with helical springs, that connect the supported portion to, and above, wheels of the vehicle which operate on the ground surface. The supported or suspended portion is generally connected to and supported above the wheels by the device.

Such basic devices retract in response to force shocks encountered by wheels during navigation on a ground surface, for example driving over a bump or a hole in the ground surface, thus lowering the supported portion relative the wheel and often relative the ground surface. The device then extends again to raise the supported portion relative the wheel and the ground surface. The overall effect is at least partial absorption, i.e. dampening, of the shocks and thus a more stable ride for the supported portion of the vehicle relative the ground surface. Typically, users of the vehicle are situated on or in the supported portion, and thus enjoy a smoother ride.

However, while such basic suspension devices provide basic stability for the vehicle, they provide very little, if anything, for adjusting the elevation of the supported portion relative the wheels and the ground surface in response to varying levels of speed of the vehicle. For example, it is often advantageous, particularly for two wheel vehicles such as motorcycles, that the supported portion be as close to the ground surface as possible to provide a lower center of gravity and additional stability, especially for short drivers, compared to normal vehicle height at normal low driving speeds. On the other hand, at higher speeds, it is also often preferable to lower the supported portion to provide a lower center of gravity and better steering and handling around curves. Thus, it is desirable that a vehicle suspension device allows the supported portion to be raised and lowered, based on speed of the vehicle, while still providing unaltered shock absorption characteristics.

For example, US Patent Application Publication No. 2009/0045595 A1 teaches a device in which a control sleeve, having a spring attached to a ring flange at a lower end of the control sleeve and to the wheel or frame, may be raised and lowered on a shaft by a motor, thus raising and lowering the supported portion above the device. However, this device offers little shock absorption capability in the lowered configuration. Furthermore, such a vehicle height adjustment device would need to be significantly reinforced and thereby becomes bulky and heavy in order to undergo severe bending and lateral efforts when a separate shock absorber assembly is mounted on the ring flange adjacent and parallel to the spring for suitable dampening and stability. U.S. Pat. No. 4,568,101 issued to Bleustein et al. teaches a device in which a compressor is connected to pneumatic or hydraulic shock absorbers of a vehicle. As vehicle speed increases and decreases, the compressor increases and decreases pressure in the shock absorbers, thus causing them to extend and retract to raise and lower the supported portion. Unfortunately, this device requires addition of a compressor, which may be cumbersome, and which has a long reaction time delay for operating changes. Further, use of additional or reduced compression alters and may compromise shock absorbing ability of the suspension device, such that the change in vehicle height not only changes the vehicle ground clearance but also changes the suspension travel.

Furthermore, because of the altering of the suspension travel and suspension behaviors, all existing systems are significantly limited in their travel range and therefore, would not provide a sufficient lowering of the body of the vehicle relative to the ground surface for a driver (of a motorcycle for example) to notice the change in vehicle height, rendering the system inefficient.

Accordingly, there is a need for an improved vehicle height adjustment suspension device of simple and compact configuration that does not alter the mechanical behaviors of the suspension of the vehicle depending on its adjustment.

SUMMARY OF THE INVENTION

It is therefore a general object of the present invention to provide an improved vehicle height adjustment suspension device.

An advantage of the present invention is that the vehicle height adjustment suspension device provides adjustable elevation of a supported portion of a vehicle while maintaining unaltered full shock absorption and suspension capabilities.

Another advantage of the present invention is that the device is compact and can be easily fitted to the vehicle in the same manner as a conventional suspension.

A further advantage of the present invention is that the device is similar in dimension to a conventional suspension.

Still another advantage of the present invention is that the device is substantially housed in, and connected to, a housing for a conventional suspension.

Another advantage of the present invention is that the device provides both automatic and manual control of raising and lowering of the supported portion, the manual control typically overriding the automatic one.

Yet another advantage of the present invention is that the device provides for rapid (almost instantaneous) height adjustment between the two extreme raised and lowered configurations thereof, which could, for example, correspond to a total height displacement of two (2) to four (4) inches (5 to 10 cm), or even more depending of the actual device size, specifications and device position, travelled within about one (1) to four (4) seconds, or more according to the vehicle speed increase (acceleration) or decrease (deceleration).

According to an aspect of the present invention, there is provided a vehicle height adjustment suspension device for raising and lowering a supported portion of a frame of a vehicle relative a ground surface upon which a wheel of the vehicle connected to a wheel section frame below the supported portion is disposed and dampening force shocks received at the wheel, the device comprising:

a suspension assembly having a shock absorber including a cylinder containing fluid for connection on a bottom cylinder end of the cylinder to the wheel section frame, and a piston rod defining an axis and extending into the cylinder with a piston housed therein, and a spring mounted proximal a top rod end of the rod and proximal the bottom cylinder end and coiled around the cylinder and rod;

a threaded screw rotatably mounted in a housing top of a housing, the housing top being connected to the supported portion, the screw extending along the axis into a threaded portion, adjacent the top rod end, of a screw channel extending into the rod along the axis; and a motor connected to the threaded screw for rotating the screw in opposing first and second directions to move the assembly and wheel connected thereto and the housing top and frame connected thereto, respectively away from and towards one another between a raised configuration distal one another, the supported portion being thereby higher relative the ground surface, and a lowered configuration proximal one another, the supported portion being thereby lower relative the ground surface, the assembly dampening the shocks when the device is in the raised configuration, the lowered configuration and between the raised configuration and the lowered configuration.

Other objects and advantages of the present invention will become apparent from a careful reading of the detailed description provided herein, with appropriate reference to the accompanying drawings.

BRIEF DESCRIPTION OF THE DRAWINGS

Further aspects and advantages of the present invention will become better understood with reference to the description in association with the following Figures, in which similar references used in different Figures denote similar components, wherein.

DETAILED DESCRIPTION OF THE PREFERRED EMBODIMENTS

With reference to the annexed drawings, the preferred embodiments of the present invention will be herein described for indicative purpose and by no means as of limitation.

Figure 1:
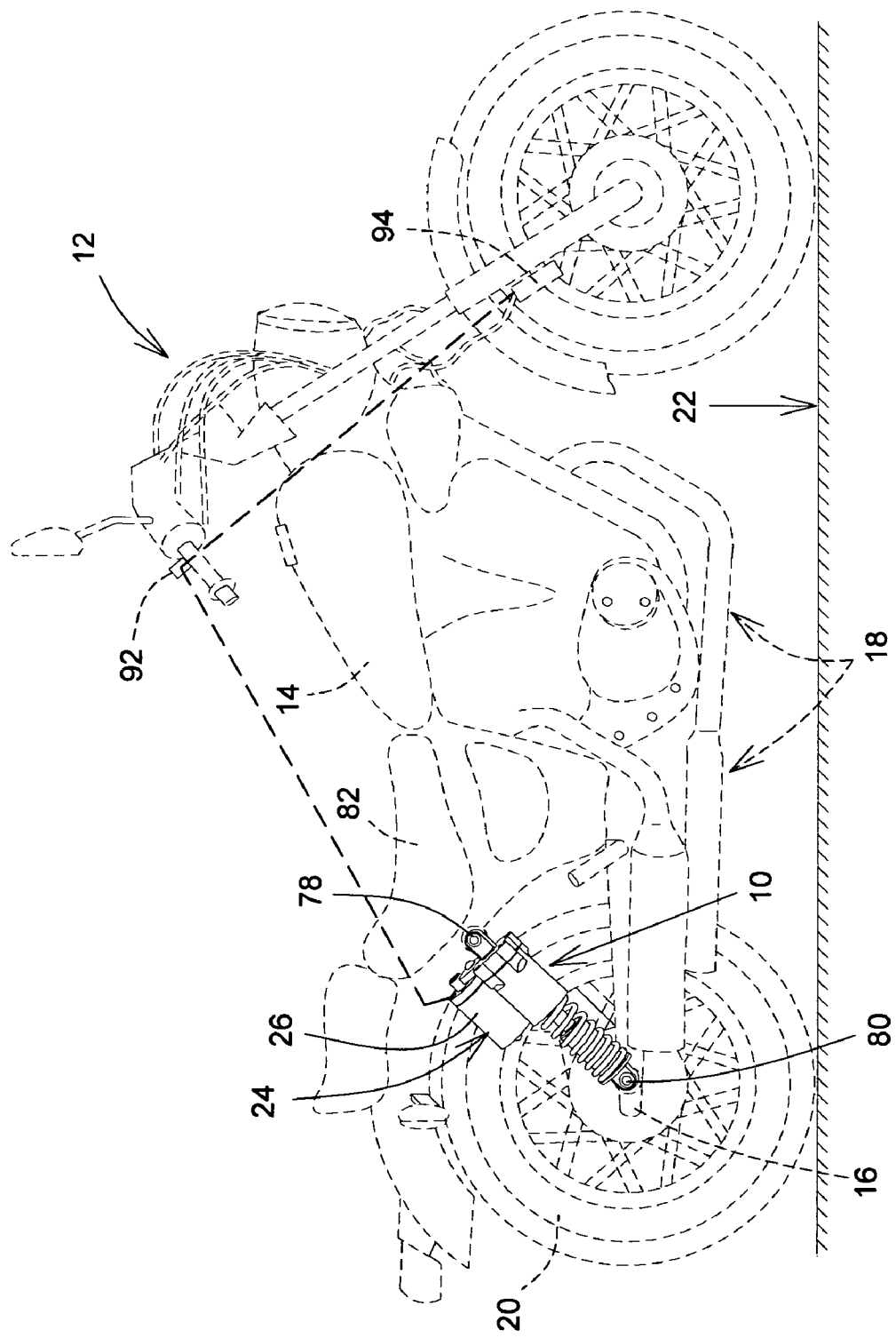
FIG. 1 is a side perspective view of a vehicle height adjustment suspension device connected to a vehicle, in accordance with the present invention.
Figure 2:
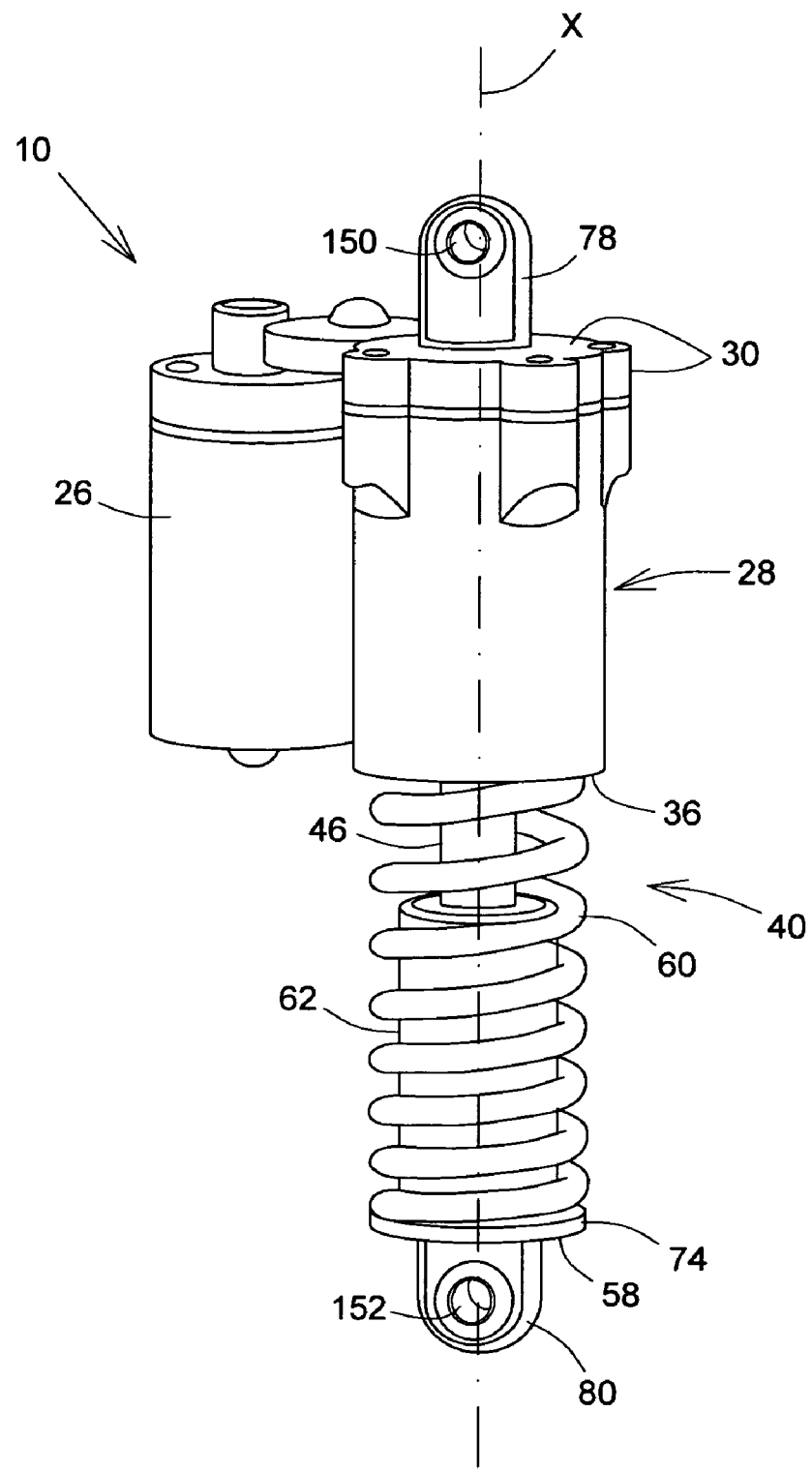
FIG. 2 is an enlarged side perspective view of the device shown in FIG. 1, removed from the vehicle.
Figure 3:
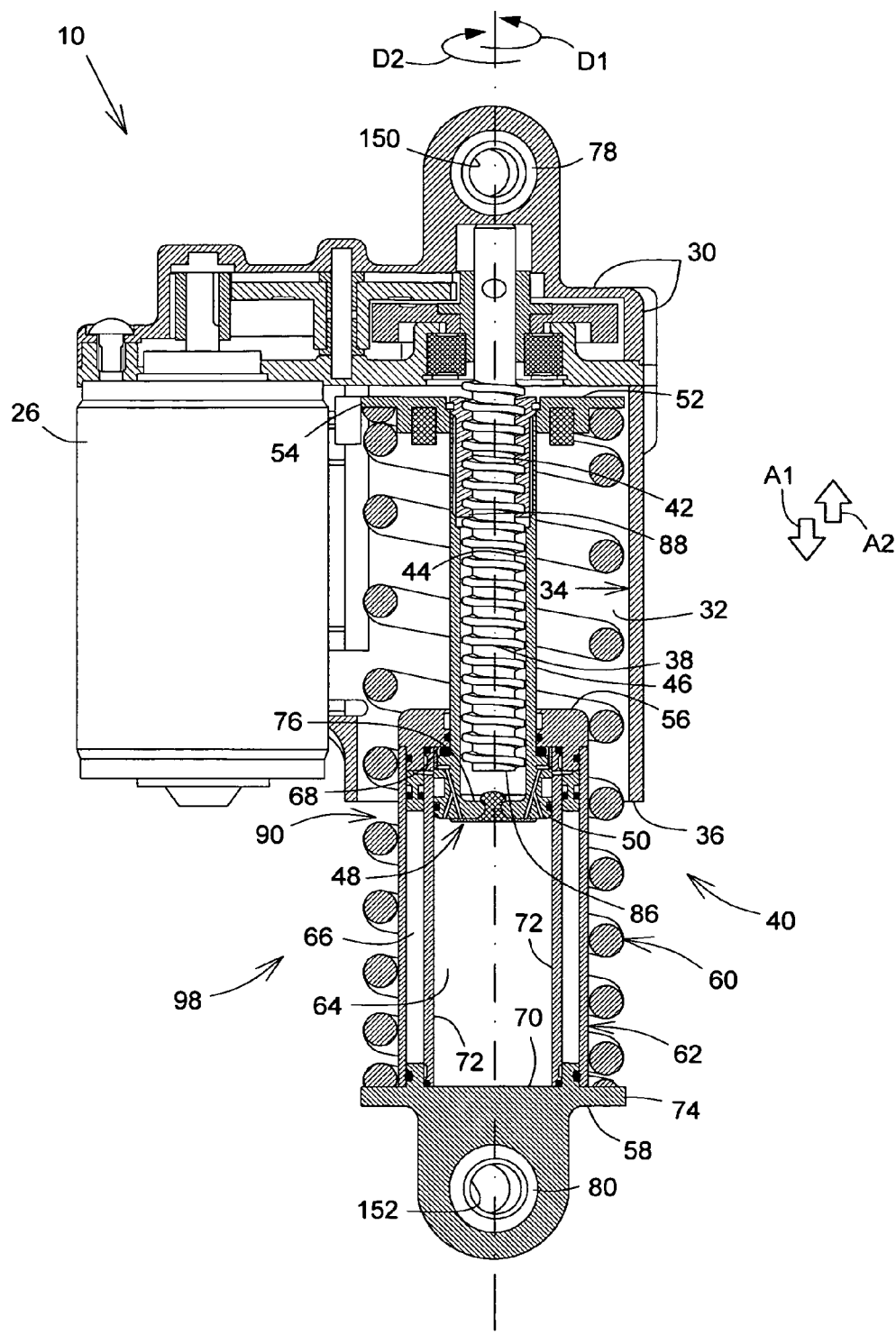
FIG. 3 is a cross sectional view of the device shown in FIG. 2, in a lowered configuration therefor.

Referring now to FIGS. 1, 2, and 3, there is schematically shown an embodiment of a vehicle height adjustment suspension device, shown generally as 10, for a motorized vehicle, shown generally as 12. As shown, the device 10 is operatively and pivotally connected, at a bottom end thereof, to a frame, shown generally as 18, of the vehicle 12 supporting a wheel 20 at a wheel section 16 thereof, and, at a top end thereof, to a suspended or supported portion 14 of the frame 18 proximal to which the driver and/or passengers of the vehicle 12 are typically situated. The wheel 20 is typically situated below the supported portion 14 and is in contact with a ground surface 22, for example the ground or a road, upon which the vehicle navigates. Thus, the device 10 raises or lowers the supported portion 14 relative the wheel 20, and thereby relative the ground surface 22 upon which the wheel is disposed, without varying the mechanical behaviors of the suspension assembly (spring and shock absorber) depending on the height adjustment.

The vehicle 12 shown is a notional motorcycle 12, with the device 10 attached to the wheel section 16, and notably axle, for the rear wheel 20 and to the frame 18 at the supported portion 14 just below the seat 82 of the motorcycle 12. However, the device 10, appropriately modified with regard to size and attachment to the vehicle 12, could be deployed on other vehicles, for example mopeds, scooters, automobiles or the like. Further, the device 10 could also be connected to front wheels of the vehicle 12.

Referring still to FIGS. 1, 2, and 3, the device 10 has a motor 24 in a motor housing 26 mounted, i.e. connected, alongside a, preferably cylindrically shaped, housing, shown generally as 28, the housing 28 being a suspension housing 28 sized and shaped for housing a notional, i.e. conventional, conventional suspension assembly for at last partially absorbing, i.e. dampening, force shocks received by the wheel 20 on the surface 22. The housing 28 has a housing top 30 and an inner, preferably cylindrically shaped hollow section 32 extending downwardly from the housing top between inner housing walls 34 to an open housing bottom end 36. A threaded screw 38 is rotatably mounted in the housing top 30, extending from inner housing top wall 47 through the hollow section 32, and is connected to motor 24. The motor 24 and motor housing 26 are preferably disposed adjacent housing top 30.

Referring now to FIGS. 1 through 6, a modified suspension assembly, shown generally as 40 and having overall dimensions similar to conventional suspension assemblies known in the art, is mounted in the housing hollow section 32 of housing 28 on the threaded screw 38. The assembly 40, as with a conventional suspension assembly, has a, preferably circular, piston, shown generally as 48, extending radially outwardly proximal a bottom rod end 50 of a piston rod, shown generally as 46, and longitudinally opposite a top rod end 52 of the piston rod 46. As with conventional shock absorbers, the piston rod 46 and piston 48 are slidably, and sealingly, mounted in a shock absorber cylinder 62, notably through the top cylinder end 56 thereof, of the assembly 40 with the top rod end 52 extending outside of the top cylinder end 56. More specifically, the rod 46 and piston 48 are axially slidably extendable and retractable back and forth along an axis X defined by rod 46 through the top cylinder end 56 within an inner chamber 64 of the cylinder 62, the piston 48 extending, preferably sealingly, to inner side walls 72 of chamber 64. The inner chamber 64, preferably cylindrical, is defined by inner chamber side walls 72 extending from an inner chamber top wall 68 proximal the top cylinder end 56 to longitudinally opposed inner chamber bottom wall 70 proximal a bottom cylinder end 58, longitudinally opposed to the top cylinder end 56. The cylinder 62 is preferably a hydraulic cylinder containing a fluid F, preferably an oil, as is well known in the art for shock absorbers. A helical spring, shown generally as 60 is mounted or connected proximal top rod end 52, for example at top rod flange 54 extending radially outwardly from the rod 46 at the top rod end 52, and proximal bottom cylinder end 58, for example at bottom cylinder flange 74 extending radially around cylinder 62 at bottom cylinder end 58. The piston rod 46 and cylinder 62 extend through the spring 60, i.e. the spring 60 is coiled around the piston rod 46 and cylinder 62, and is typically coaxial therewith. As with conventional shock absorbers, the piston 48 is sized and shaped to extend from rod 46 to inner chamber side walls 72 with the fluid F providing resistance to movement of the piston 48 in chamber 64 towards the bottom cylinder end, thus resisting and slowing the movement of the piston 48 there towards and dampening impact of shocks on the supported portion 14. As with conventional shock absorber assembly, once the shock is dampened the spring 60 biases the rod 46 and piston 48 away from the bottom cylinder end 58 and inner chamber bottom 70. As will be explained in further detail below, the assembly 40 provides absorption and dampening of force shocks at supported portion 14 from the wheel 20 on ground surface 22 in the same fashion as a conventional suspension assembly.

As shown, an upper connector, for example, a top socket or bracket 78, extends axially along axis X from the housing top end 30 and is configured for attachment to the supported portion 14 proximal the seat 82, for example by attachment of a bolt extended through a top connector channel 150 of the connector 78 to the supported portion 14, as with a typical suspension assembly. Similarly, a bottom connector 80, such as a bottom socket 80 or bracket, extends axially along axis X from the bottom cylinder end 58 and is configured for attachment to the wheel 20 and/or wheel supporting section 16, for example by attachment of a bolt or axle for wheel extended through a bottom connector channel 152 of the connector 80, again as for a conventional shock absorber assembly.

The threaded screw 38 is connected to the assembly 40, thus mounting the assembly 40 on the screw 38, with the threaded screw 38 extending axially along axis X through the top rod end 52 into a screw channel 44 extending axially on axis X into piston rod 46 to a channel bottom 76. More specifically, the screw channel 44 has a threaded channel portion or screw 42 extending adjacent the top rod end 52, for meshing with the screw 38 extending therethrough into the channel 44. The motor 24 is actuable to rotate the screw 38 on axis X in opposite first and second directions D1 and D2. As the screw 38 is rotated in first direction D1, the registering engagement and cooperation between threads of the screw 38 and threaded portion 42 cause the top rod end 52, and thereby the assembly 40 and wheel 20 connected thereto to move in axial direction A1 relative axis X away from the housing top 30 and supported portion 14 connected thereto, thus raising the supported portion 14 relative the surface 22. Conversely, as the screw 38 is rotated in second direction D2, the registering engagement and cooperation between threads of the screw 38 and threaded portion 42 cause the top rod end 52, and thereby the assembly 40 and wheel 20 connected thereto to move in axial direction A2 on screw 38 relative axis X towards the housing top 30 and supported portion 14, thus lowering the supported portion 14 relative the surface 22.

Figure 4:
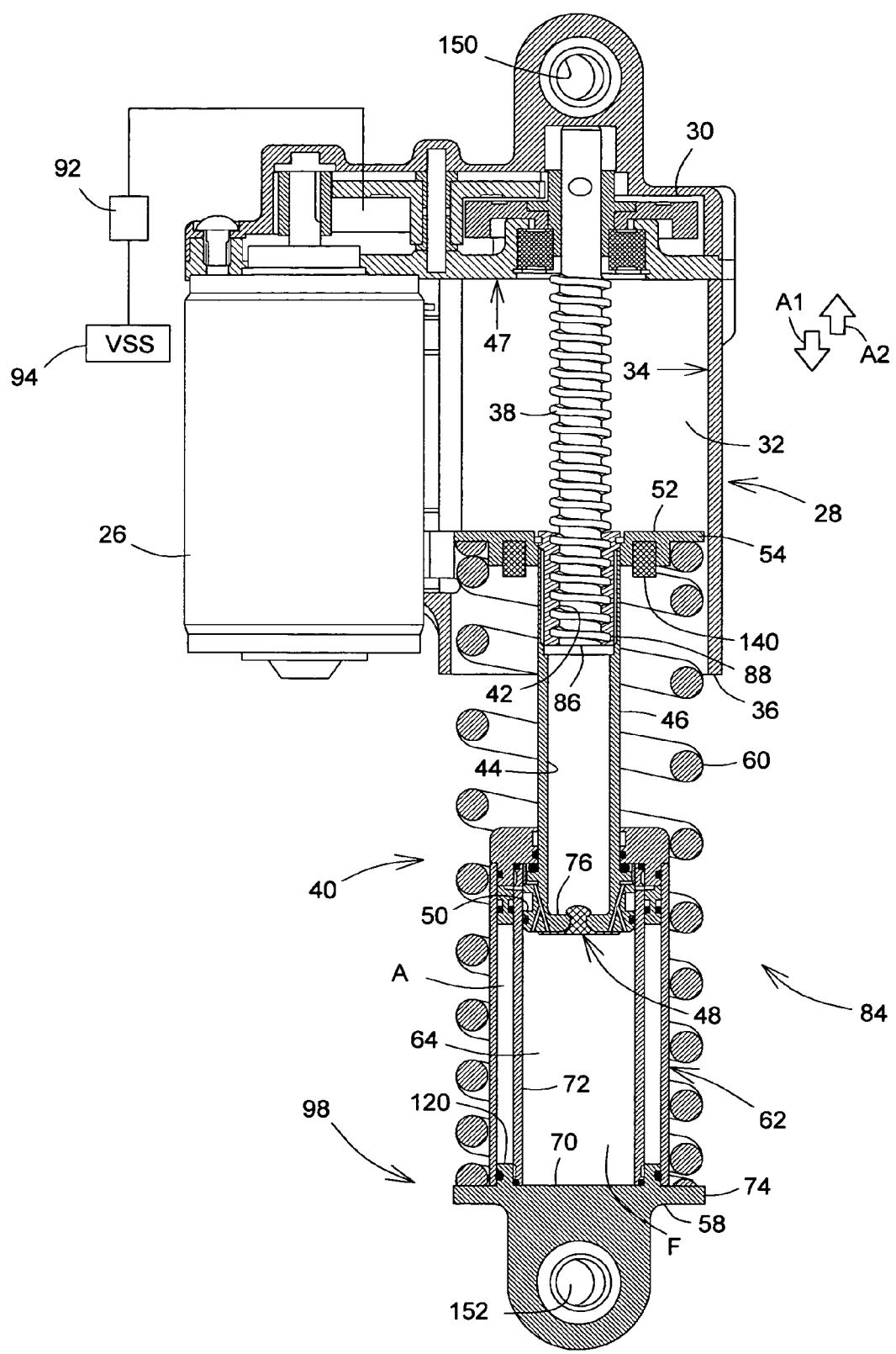
FIG. 4 is a cross sectional view of the device shown in FIG. 2, in a raised configuration therefor.

Accordingly, by rotating the screw 38 in direction D1, the assembly 40 and housing top 30 are moved in direction A1 away from one another towards a raised configuration, shown generally as 84 in FIG. 4, for device 10 in which the assembly 40 and housing top 30 are distal one another, preferably with the bottom screw end 86 situated proximal the top rod end 52, for example at the bottom threaded portion end 88 of threaded portion 42. As the housing top 30 and assembly 40 are extended away from one another in the raised configuration 84, so are the wheel 20 at bottom connector 80 and the supported portion 14 at top connector 78. Thus, the supported portion 14 is raised relative to the wheel 20 and surface 22.

By rotating the screw 38 in direction D2, the assembly 40 and housing top 30 are moved in direction D2 towards one another for a retracted lowered configuration, shown generally as 90 in FIG. 3, for the device 10 in which the assembly 40, notably top rod end 52, and housing top 30 are proximal one another, preferably with the bottom screw end 86 situated at the channel bottom 76. As the housing top 30 and assembly 40 are retracted towards one another in the lowered configuration 90, so are the wheel 30 at bottom connector 80 and the supported portion 14 at top connector 78, and thus the supported portion 14 is lowered relative to the wheel 20 and surface 22, as compared to the raised configuration 84. Thus, the device 10 provides for axial movement of assembly 40 between the raised configuration 84, where the supported portion 14 is raised to maximum height compared to surface 22 for maximum maneuverability at higher speeds, and the lowered configuration 90 shown in FIG. 3, where the supported portion 14 is lowered to minimum height compared to surface 22, for maximum stability at lower speeds. At the same time, the suspension assembly 40 (shock absorber 46, 48, 62 and spring 60), which moves axially along axis X provides dampening absorption of shocks regardless of whether the device 10 is in the raised configuration 84, lowered configuration 90, as well as at any intermediate configuration between configurations 84, 90 and the corresponding height of the supported portion 14 relative the surface 22.

To control the extension and retraction of device 10 between the raised and lowered configurations 84, 90, and thereby raising and lowering of supported portion 14 relative the surface 22, the motor 24 has, or is connected to a, controller 92, preferably electronic, connectable to a vehicle speed sensor 94 that detects the speed of the vehicle 12. The controller 92 receives, preferably constantly, the vehicle speed, or speed data indicating the vehicle speed. The controller 92, based on the vehicle speed, or speed data, is programmed to start actuating the motor in direction D1 to turn the screw 38 in direction D1 to extend the device 10 towards the raised configuration 84 when the vehicle increasing speed reaches a first threshold value or speed. Thus, at high speeds above the first threshold within a first speed range, the device 10 automatically and typically proportionally raises the supported portion 14 away from the surface 22 while within the first speed range until the device is in the raised configuration 84 at the end of the first speed range. Based on the controller's 92 programming, the controller 92 may also start actuating the motor 24 in direction D2 to turn the screw in direction D2 to retract the device 10 towards the lowered configuration 90 when the vehicle decreasing speed below a second threshold value or speed. Thus, at lower speeds, below the second threshold within a second speed range, the device 10 automatically and typically proportionally lowers the supported portion 14 towards the surface 22 while within the second speed range until the device 10 is in the lowered configuration 84 at the end of the second speed range, ultimately at speed zero or at rest.

As a typical example, the first speed threshold is about 22 mph (about 40 km/h) with the end of the first speed range at about 6 mph (10 km/h), namely a first speed range of about 16 mph (about 30 km/h), such that the device 10 gradually lowers the supported portion 14 from about 22 mph (about 40 km/h) down to the lowered configuration 90 at and below about 6 mph (10 km/h). Similarly, the second speed threshold is about 6 mph (about 10 km/h) with the end of the second speed range at about 17 mph (30 km/h), namely a second speed range of about 11 mph (about 20 km/h), such that the device 10 gradually raises the supported portion 14 from about 6 mph (about 10 km/h) up to the raised configuration 84 at and above about 17 mph (30 km/h).

As a further and preferred example, the first speed threshold is about 10 mph (about 15 km/h) with the end of the first speed range at zero speed, namely a first speed range of about 10 mph (about 15 km/h), such that the device 10 gradually lowers the supported portion 14 from about 10 mph (about 15 km/h) down to the lowered configuration 90 at complete stop. Similarly, the second speed threshold is at zero speed with the end of the second speed range at about 10 mph (15 km/h), namely a second speed range of about 10 mph (about 15 km/h), such that the device 10 gradually raises the supported portion 14 from start up to the raised configuration 84 at and above about 10 mph (15 km/h).

If desired the first and second thresholds for vehicle speed may be the same, in which case there is only one speed threshold. Additionally, the controller 92 could be programmed with additional thresholds or speed ranges, such as a third and fourth speed thresholds above the first speed threshold which would correspond to rotating the screw 38 in direction D1 or D2 between the raised configuration 84 and lowered configuration 90. In such case, for example, at raising speed, when the vehicle speed reaches the third threshold, the vehicle height would gradually decrease until the fourth threshold is reached at which, and above which, the device is in the lowered configuration 90 (for increased stability at vehicle speed above third and especially fourth thresholds), and vice-versa for the decreasing vehicle speed between the fourth and the third thresholds. The controller 92 could also be programmed to rapidly actuate the motor 24 in direction D1 and D2 to provide almost instantaneous change between configurations 84, 90 at specific threshold(s).

If desired, but preferably, the controller 92 may provide an interface accessible to a user or driver of the vehicle 12, for example on the supported portion 14, for enabling the user to manually actuate the motor 24 in either direction D1 or D2 to rotate the screw 38 in direction D1 or D2 to lower and raise the supported portion 14 relative the surface 22, regardless of speed of the vehicle 12. The interface, not shown, could consist, for example, of buttons or levers actuatable by the user. Thus, the user may manually override the thresholds and actuate the motor 24 via controller 92 to raise and lower the supported portion 14 relative the ground surface 22 between the maximum and minimum heights corresponding to the raised and lowered configuration 84, 90.

The threaded portion 42 is preferably constructed of bronze to reduce friction as threaded screw rotates therein. Thus, the lifespan of the screw 38 is lengthened. The screw 38 may also be constructed of bronze. Other materials for the threaded portion 42 and screw 38 may be envisaged, although materials providing lower friction and resistance to rotation are preferred to prolong life of the device 10.

The position of assembly 40 relative to housing top 30, i.e. the position of the assembly 40 between raised and lowered configurations 84, 90 could be detected by a variety of detecting means and methods know in the art, including use of position or rotational sensors and timing the length of rotation of the screw 38, among others. The connection between the controller 92 and motor 24, as well as between the controller 92 and the vehicle speed sensor 94 may be effected by any means known in the art, including use of wires or wirelessly.

Having explained the structure and function of the function of the device 10 to raise and lower the supported portion of vehicle 14, the structure and function of the suspension assembly 40 will now be explained, with reference to FIGS. 1 through 7. As previously described, and similar to conventional suspension assemblies, the assembly 40 includes a hydraulic cylinder 62 of similar outer dimension to a cylinder for a conventional shock absorber, a helical spring 60, fluid F in the cylinder 62, and piston rod 46 and piston 48 axially slidable back and forth on axis X through top cylinder end 56. Other types of cylinders and shock absorbing mechanisms could be envisaged, for example pneumatic cylinders using air. However, use of pneumatic cylinders generally requires presence and or use of compressors for air inside the cylinders, as well as very precise compression of air. Further, heating and cooling of air in pneumatic cylinders for shock absorption can cause significant changes in pressure within the cylinder, thus modifying unpredictably the shock absorption provided. Therefore, use of hydraulic cylinder 62, less susceptible to such changes and requiring less space and maintenance than pneumatic cylinders, is preferable.

Figure 5:
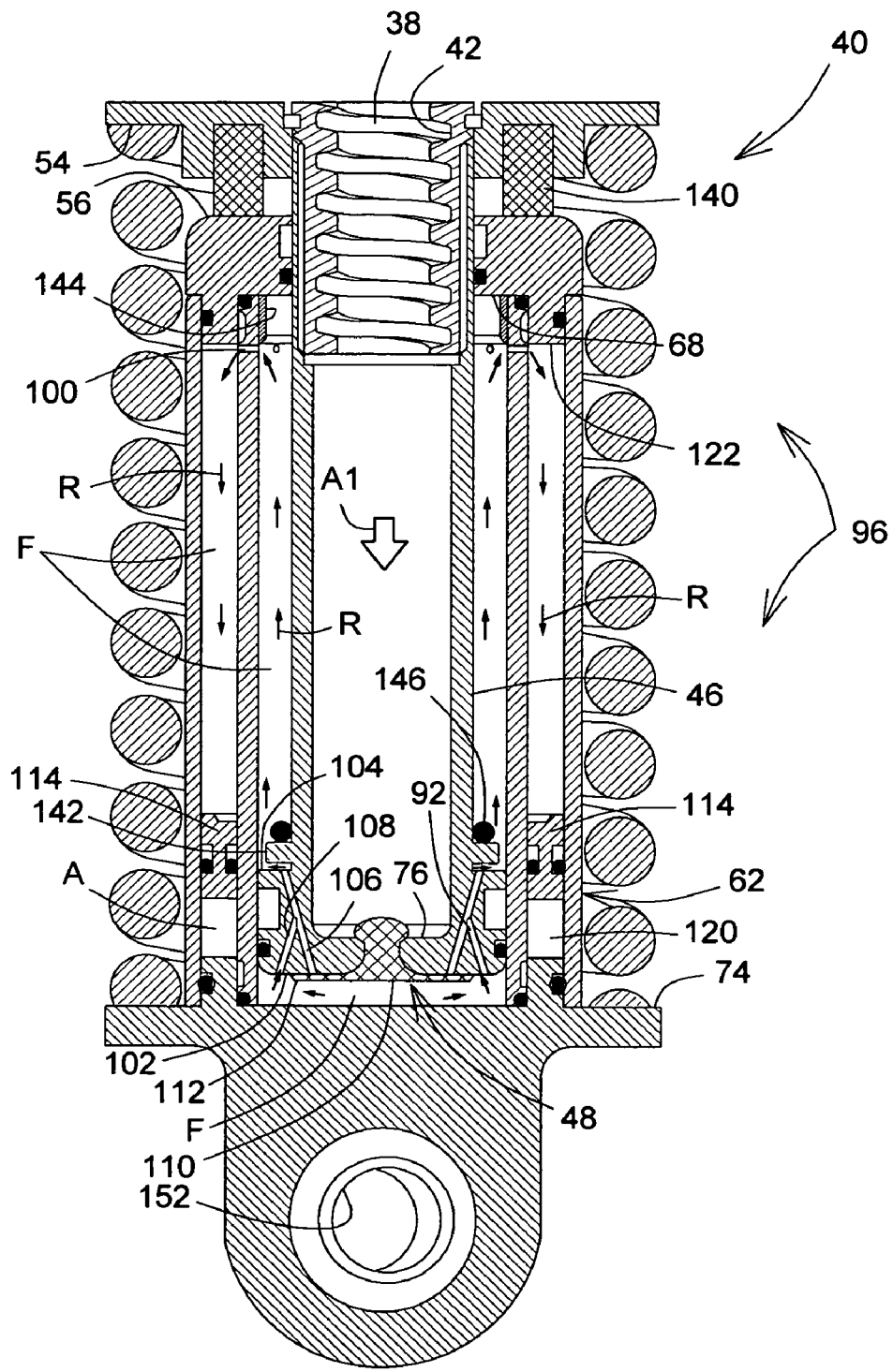
FIG. 5 is a is a cross sectional view of the device shown in FIG. 2, showing the suspension assembly thereof in a compressed or retracted configuration therefor.
Figure 6:
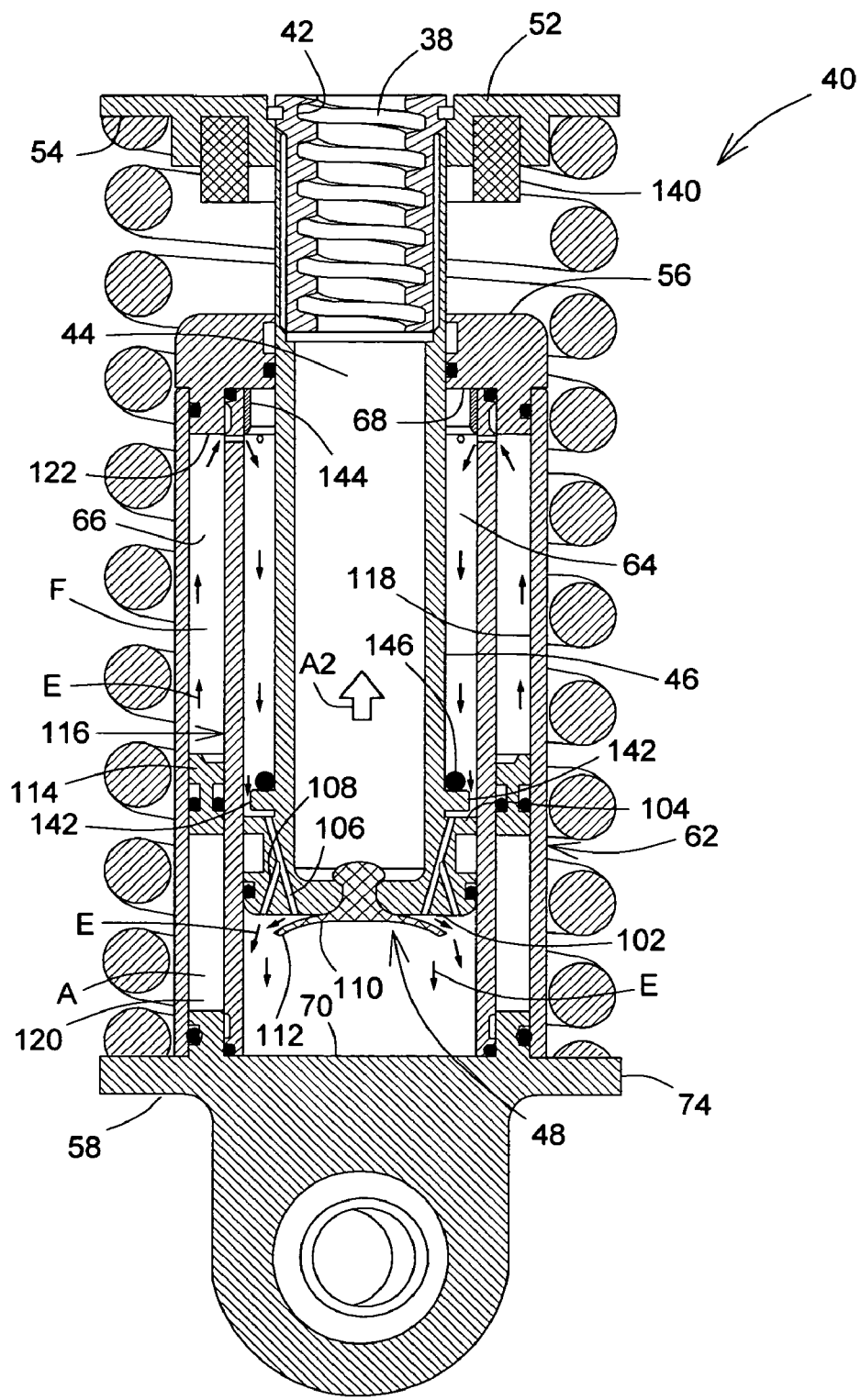
FIG. 6 is a cross sectional view of the device shown in FIG. 2, showing the suspension assembly thereof in a partially expanded or extended configuration therefor.

As with conventional shock absorbers, the cylinder 62 and piston rod 46, including piston 48, are slidable back and forth relative one another on rod 46 along axis X between retracted configuration 96 and extended configuration for assembly 40. Like conventional shock absorbers, when the wheel 20 receives a force shock on the surface 22, for example a bump or hole on the surface 22, the force of the shock is transferred through bottom connector 80 to the assembly 40. The force of the shock causes the cylinder 62 to slide on rod 46 towards the top rod end 52, thereby moving the piston 48 and rod 46 in inner chamber 64 towards bottom cylinder end 58 and inner chamber bottom wall 70, compressing the spring 60 between top rod flange 54 and bottom cylinder flange 74, at least partially towards a retracted configuration 96 for the assembly 40. This movement of cylinder 62 and top rod flange 54 towards each other, along with compression of spring 60, partially absorbs the shock and dampens impact of the shock on the supported portion 14. In the retracted configuration 96 (as seen in FIG. 5), the top cylinder end 56 is adjacently proximal, and preferably abuts, the top rod flange 54 at top rod end 52 and the spring 60 is fully compressed between flanges 54, 74. Further, the rod 46, piston 48, cylinder 62, and inner chamber 64 are configured, i.e. sized and shaped, such that bottom rod end 50 and piston 48 are adjacently proximal the inner chamber bottom wall 70 and cylinder bottom end 58 for the retracted configuration 96.

As the assembly 40 moves towards the retracted configuration 96, the fluid F in cylinder 62, notably inner chamber 64 provides resistance to piston 48 moving towards inner chamber bottom wall 70, further absorbing and dampening the force of shocks and slowing movement of cylinder 62 to further reduce impact and cushion supported portion 14 from the shock. Subsequently, once the shock has been at least partially absorbed, the spring 60, along with compressed air A and fluid F in the cylinder 62, resiliently biases the cylinder 62 and top rod end 52 away from each other towards the extended configuration 98 shown in FIGS. 3 and 4), the compressed air A essentially preventing any time delay or lag between the change in displacement directions from the retracted configuration 96 towards the extended configuration 98. In the extended configuration 98, the spring 60 is fully extended (while still slightly compressed), and the cylinder 62 is distal the top rod end 52 and flange 54 with the piston 48 and bottom rod end 50 adjacently proximal the top cylinder end 58, notably inner chamber top wall 68 in inner chamber 64.

To accommodate the threaded screw 38 and threaded portion 42 in the rod 46, the rod 46 is generally of greater outer perimeter or circumference than a rod for a piston in a conventional shock absorber assembly. Similarly, to accommodate the rod 46 in the cylinder 62 while maintaining outer dimensions of cylinder 62, i.e. the volume and shape occupied by cylinder 62, similar to a cylinder for a conventional shock absorber assembly, the piston 48, piston rod 46, and interior of the cylinder 62 are modified compared to a conventional shock absorber assembly. To provide adequate volume and space for fluid F located around the piston rod 46, the cylinder 62 has additional, preferably annular, outer extension chamber 66 extending around inner chamber 64. An inner chamber aperture 100 extends through, and preferably around (aperture 100 comprised of a plurality of apertures generally circumferentially equidistantly spaced from one another), inner chamber side wall 72 proximal the inner chamber top 68 and provides fluid F communication between chambers 64, 66 for passage of fluid F therebetween without any restriction. Accordingly, one will understand that the surface area of the section of the outer chamber 66 is substantially similar to the surface area of the section of the piston rod 46.

The outer chamber 66 is closed, at the end opposite the piston 48, by an annular piston 114 that extends, preferably sealingly, across the outer chamber 66, from an outer side 116 of inner chamber side wall 72 to an outer side wall 118 of the chamber 66. The annular piston 114 is axially movable relative axis X within the outer chamber 66. The outer chamber 66, on the other side of annular piston 114 from the fluid F, contains a quantity of compressed air A at low pressure between the annular piston 114 and an outer chamber bottom 120 proximal the bottom cylinder end 58. The fluid F is situated between the annular piston 114 and an outer chamber top 122 disposed proximal the top cylinder end 56, as well as in the inner chamber 64. The aperture 100 is situated adjacently proximal, but spaced apart from outer chamber top 122. The fluid F flows from the space between annular piston 114 and outer chamber top 122 back and forth through aperture 100 to and from inner chamber 64.

The piston 46 has a plurality of circumferentially spaced apart inner channels 106 and circumferentially spaced apart outer channels 108 extending threrethrough from a piston bottom 102 to a piston top 104, to allow for passage of the fluid F through piston 48, and sized and shaped to properly restrict fluid flow therethrough and dampen the shock forces. The optional, although preferable, inner channels 106 typically slant outwardly upwardly from the piston bottom 102 to top 104. Each outer channel 108 typically extends slantingly inwardly from the piston bottom 102 to a respective connecting inner channel 106, the inner channels being positioned relatively inwardly on the piston bottom 106 compared to the outer channels 108. A flexible check valve 110, for example an umbrella valve 110, of flexible and impermeable material is mounted on the piston bottom 102 and radially from a center of piston bottom 102 to an outer valve edge or perimeter 112 which extends around the bottom 102 between the inner channel 106 at the piston bottom 102 and the outer channels 108 at the bottom 102. Alternatively, the inner 106 and outer 108 channels could be independent from one another and both be typically vertically oriented, or have any other orientation, as long as the principle explained hereinbelow with the check valve 110 keeps the same functioning principles, e.g. having fluid flowing into the inner channels 106 only displacement of the piston 48 in the second direction A2, towards the extended configuration 98.

As the piston 48 moves towards the inner chamber bottom wall 70 and bottom cylinder end 58 towards the retracted configuration 96, the valve 110 is pushed completely against the piston bottom 102 by the fluid F and covers the inner channel 106 at the bottom 102, preventing fluid F from flowing through the inner channels 106 from the bottom channel ends at bottom 102. Accordingly, as shown by arrows R in FIG. 5, during retraction towards retracted configuration 96 during absorption of shocks, fluid F can only flow from the piston bottom 102 through the outer channels 108 and into the inner channels 106 to the chamber 64 above piston 48 and the aperture 100 to outer chamber 66. Therefore, as assembly 40 moves towards retracted configuration, flow of fluid F is reduced or slowed because of the outer channels 108, thus slowing movement towards retracted configuration 96 to facilitate absorption of shocks. In contrast, as the piston 48 moves towards the inner chamber top wall 68 when the assembly 40 is moved towards the extended configuration 98, the fluid F passing through inner channel 106 from piston top 104 towards piston bottom 102 pushes the flexible valve 110 away from the bottom 102. Thus, as shown by arrows E in FIG. 6, fluid F may flow from piston top 104 to piston bottom 102 through both channels 106, 108 at bottom 102 as assembly 40 extends towards extended configuration 98. The use of both inner and outer channels 106, 108 is required to allow a quicker come back in the original configuration (towards the extended configuration 98) while still dampening the shock force. Accordingly, compared to movement towards retracted configuration 96, flow of fluid F from outer chamber 66 via aperture 100 into inner chamber 64 through the piston 48 is facilitated for the assembly 40 as it resiliently moves back towards extended configuration 98 via the help of spring 60.

As the assembly 40 may be extended and retracted between, respectively, extended configuration 98 and retracted configuration 96 at the same time as the device moves between raised and lowered configurations 84, 90, the supported portion 14 may be raised or lowered relative surface 22 by screw 38 while retaining shock absorption capabilities unaltered. Further, since the housing 28 and assembly 40 are similar in size to a conventional suspension, with motor 24 connected alongside housing 28, the device 10 can easily replace the conventional suspensions. The fact that the device 10 may be connected to the vehicle 12 in the same fashion as a conventional suspension further facilitates installation of device 10 and replacement of conventional suspensions. Only the additional connection of motor 24 to electrical system of vehicle 12 and of motor 24 and/or controller 92 to the vehicle speed sensor 94 are required. Further, to provide compactness for device 10, the housing 28, screw 38, cylinder 62, and said piston rod 46 are sized and shaped for containment of the cylinder 62 within the housing 28 with the bottom connector 80 extending axially out of the housing 28 when the device 10 is in the lowered configuration 90 and the assembly 40 is at the same time in the retracted configuration 96 and for containing the threaded screw 38 and the cylinder top end 56 in housing 28 when the device 10 is in the raised configuration 84 and the assembly is in the extended configuration 98.

As the assembly 40 moves into the retracted configuration 96, the fluid F is forced through the aperture 100 into the outer chamber 66 by the piston 48 moving towards the inner chamber bottom wall 70 and bottom cylinder end 58 towards the retracted configuration 96, thus forcing the annular cylinder 114 to move towards the outer chamber bottom 120, which compresses the air A to a higher pressure. The air A at the higher pressure creates additional resistance to, and thereby slows, further movement towards the retracted configuration 96 to facilitate absorbing of the shocks. The air A at higher pressure also rapidly pushes the annular piston 114 back towards the outer chamber top 122 upon reverse displacement. As the annular piston 114 moves towards the outer chamber top 122 during movement of assembly towards extended configuration 98, the air A is decompressed back towards lower pressure.

Figure 7:
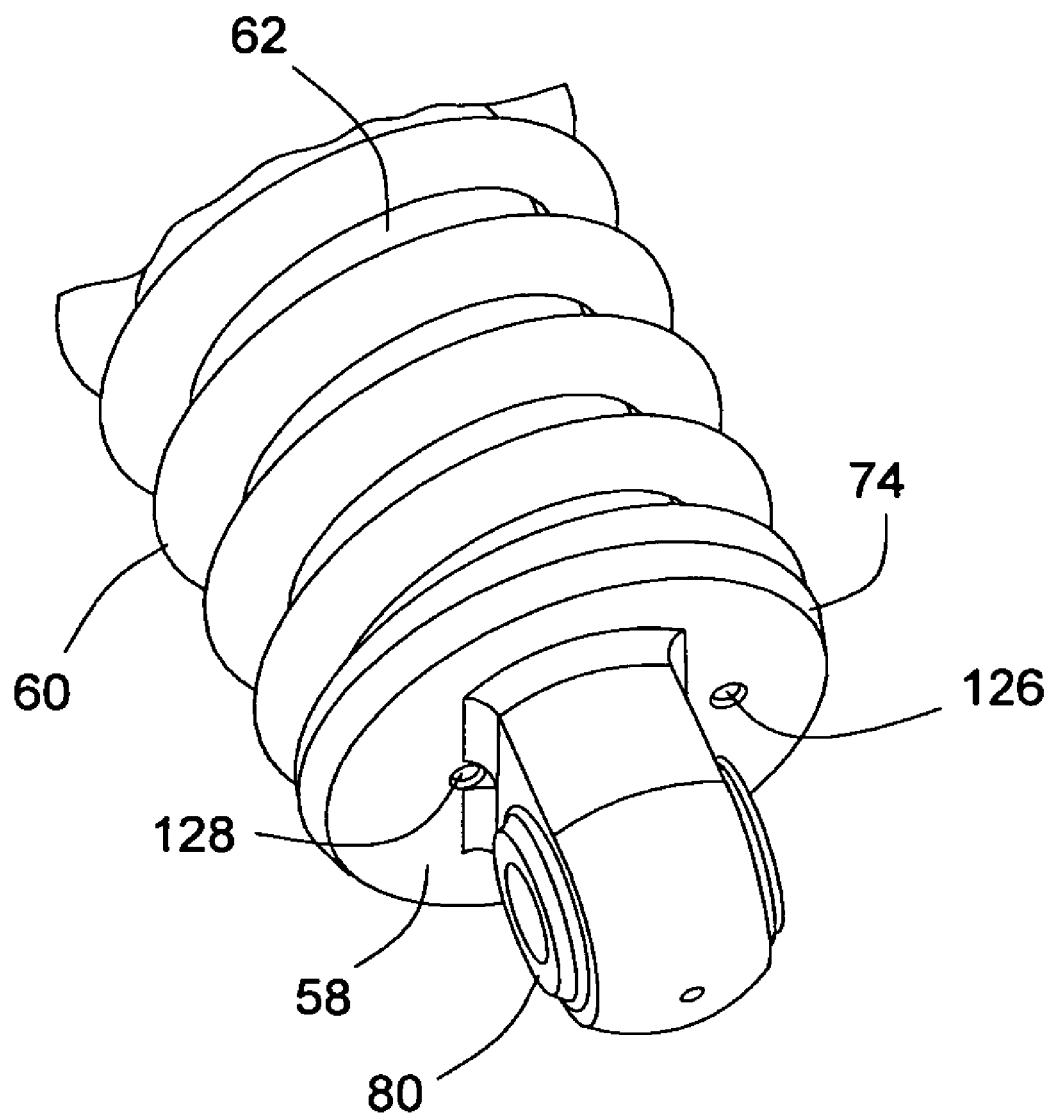
FIG. 7 is a partial bottom perspective view of the device shown in FIG. 2.

To permit filling of the assembly with air A and fluid F, the device 10 has, respectively a respective air fill hole or channel 126 for air A and respective fluid fill hole or channel 128 accessible from the bottom cylinder end 58, as shown in FIG. 7. The respective air fill channel 126 pneumatically communicates between outer chamber bottom 120 and bottom cylinder end 58 to enable filling of outer chamber 66 with air between annular piston 114 and chamber bottom 120. The fluid fill hole 128 fluidly communicates between inner chamber bottom wall 70 and bottom cylinder end 58 and provides for filling and bleeding of inner chamber 64 and outer chamber 66 between outer chamber top 122 and annular piston with fluid F. The filling of the outer chamber 66, i.e. the initial pressurization of air, with low pressure air A is preferably completed first, i.e. prior to filling with fluid F, to ensure that the annular piston 114 is as close to the outer chamber top 122 as possible and avoid overfilling the cylinder 62 with fluid F. The piston 48 is then cycled between the extended 98 and retracted 96 configurations a few times to force any entrapped air to reach the inner chamber bottom wall 70 for further bleeding of the inner chamber 64. The latest steps are typically repeated a few times before the inner chamber 64 is free of air.

To minimize risk of damage to the flexible valve 110, at least one top flange rubber ring stopper 140 extends axially, relative axis X, from the top rod flange 54 towards the cylinder 62. The ring stopper 140, preferably made from a hard rubber, abuts against said top cylinder end 56 when the assembly 40 is in the retracted configuration 96 where the valve 110 and rod bottom end 50 are adjacent to, but slightly spaced apart from, inner chamber bottom wall 70. Thus, the ring stopper 140 prevent furthers movement of the bottom rod end 50 and valve 110 towards inner chamber bottom wall 70 and collision therewith.

To slow movement of the piston 48 and rod 46 as the assembly 40 approaches the extended configuration 98, the piston rod 46 has an lower flange 142 extending radially therearound proximal the piston 48 and inner chamber 64 has a rubber type stopper 146 (better shown in FIGS. 5 and 6) in abutment therewith adapted to abut the inner chamber top wall 68 as the piston 46 approaches the inner chamber top wall 68 during movement into the extended configuration 98 and the piston top 104 passes beyond the aperture 100. Just before the stopper 146 reaches the chamber top wall 68, the external surface of the lower flange 142 gets into sealing contact with a cylindrical inner top ring 144, typically made out of rubber type material or the like and mounted onto the inner chamber side wall 72 in abutment with the inner chamber top wall 68, to trap the fluid located above the flange 142 to prevent it from escaping below the piston 48 through the inner 106 and outer 108 channels, such that the fluid itself acts as a movement damper while being compressed. Thus, movement of piston 48, and assembly 40, is slowed just before the assembly 40 reaches the extended configuration 98 since the fluid trapped above the piston top 104 cannot also reach the aperture 100 and outer chamber 66 to escape from the section of the inner chamber 64 above the piston 48.

Although the present vehicle suspension device 10 has been described with a certain degree of particularity, it is to be understood that the disclosure has been made by way of example only and that the present invention is not limited to the features of the embodiments described and illustrated herein, but includes all variations and modifications within the scope and spirit of the invention as hereinafter claimed.

I claim:

1. A vehicle height adjustment suspension device for raising and lowering a supported portion of a frame of a vehicle relative a ground surface upon which a wheel of the vehicle connected to a wheel section frame below the supported portion is disposed and dampening force shocks received at the wheel, the device comprising:
   a suspension assembly having a shock absorber including a cylinder containing fluid for connection on a bottom cylinder end of the cylinder to the wheel section frame, and a piston rod defining an axis and extending into the cylinder with a piston housed therein, and a spring mounted proximal a top rod end of the rod and proximal the bottom cylinder end and coiled around the cylinder and rod;
   a threaded screw rotatably mounted in a housing top of a housing, the housing top being connected to the supported portion, the screw extending along said axis into a threaded portion, adjacent said top rod end, of a screw channel extending into said rod along said axis; and
   a motor connected to the threaded screw for rotating the screw in opposing first and second directions to move the assembly and wheel connected thereto and the housing top and frame connected thereto, respectively away from and towards one another between a raised configuration distal one another, the supported portion being thereby higher relative the ground surface, and a lowered configuration proximal one another, the supported portion being thereby lower relative the ground surface, the assembly dampening said shocks when said device is in said raised configuration, said lowered configuration and between said raised configuration and said lowered configuration.

2. The device of claim 1, wherein the cylinder is slidable on the piston rod along said axis, to dampen said shocks, towards a retracted configuration for the assembly in which the cylinder is adjacently proximal the top rod end and the spring is compressed, and towards an extended configuration for the assembly in which the cylinder is distal the top rod end and the spring is extended.

3. The device of claim 1, wherein the fluid slows sliding of the piston in the cylinder during sliding of the assembly towards a retracted configuration to dampen the shocks, the spring biasing the assembly back towards an extended configuration once the shock is dampened.

4. The device of claim 1, wherein the threaded portion is made of bronze to reduce friction between said screw and said threaded portion as said screw is rotated in said first and second directions.

5. The device of claim 1, further comprising a bottom connector extending axially along said axis from the bottom cylinder end, said bottom connector having a respective bottom connector channel extending therethrough for receiving a wheel attachment member for attaching the bottom cylinder end to the wheel section frame.

6. The device of claim 1, wherein the fluid is an oil.

7. The device of claim 6, wherein said housing is a suspension housing for a notional suspension assembly for the vehicle.

8. The device of claim 1, further comprising a controller connected to the motor, the controller being connectable to a vehicle speed sensor of the vehicle for communicating of a vehicle speed of the vehicle sensed by the sensor to the controller, the controller actuating the motor to turn the screw in the first direction or the second direction based on the vehicle speed.

9. The device of claim 8, wherein the controller is configured for, when a decreasing vehicle speed reaches a first predetermined threshold value, actuating the motor to turn the screw in said second direction to move the assembly towards the lowered configuration and lower the supported portion, said controller actuating the motor to turn the screw in said second direction, thereby moving the assembly towards the raised configuration and raising the supported portion, when an increasing vehicle speed reaches a second predetermined threshold value.

10. The device of claim 9, wherein said controller provides selectable actuation by a user of the vehicle to actuate the motor to turn the screw in the first direction and in the second direction, as selected by the user, regardless of the vehicle speed.

11. The device of claim 1, further comprising an upper connector extending axially along said axis from the housing top, said upper connector for connecting the device to the supported portion.

12. The device of claim 1, wherein said cylinder comprises a cylindrical inner piston chamber extending axially relative said axis from an inner chamber bottom disposed proximal said bottom cylinder end to an inner chamber top proximal a top cylinder end, longitudinally opposite said cylinder bottom end, of said cylinder and said piston rod extends from said top rod end to a longitudinally opposite bottom rod end, said piston being disposed at said bottom rod end, said piston and said fluid moving axially within said inner chamber, said piston being adjacently proximal said inner chamber bottom when said assembly is in a retracted configuration and adjacently proximal said inner chamber top when said assembly is in an extended configuration.

13. The device of claim 12, further comprising a circular top rod flange extending radially from the rod at said top rod end and outside the cylinder towards said cylinder, said top rod flange having a stopper flange made of a hard rubber mounted thereon and extending axially towards said bottom for abutting against said top cylinder end when said assembly is in said retracted configuration to prevent further extension of the rod bottom end towards said bottom cylinder end and abutment of said piston against said inner chamber bottom.

14. The device of claim 13, wherein said cylinder further comprises an annular outer chamber extending around said inner chamber, said inner chamber having an inner chamber aperture extending therearound proximal the inner chamber top for passing of the fluid therethrough between the inner chamber and the outer chamber, the fluid being forced through the aperture from the inner chamber into the outer chamber as said piston and piston rod move towards the inner chamber bottom end towards said retracted configuration, the fluid being drawn back into the inner chamber when the piston and piston rod move axially towards the inner chamber top for extended configuration.

15. The device of claim 14 wherein said piston extends sealingly against an inner chamber side wall of said chamber, said aperture extending through said inner chamber side wall, said piston having a plurality of spaced apart outer channels extending threrethrough, said fluid flowing through said outer channels as said piston moves within said inner chamber for dampening of said shocks.

16. The device of claim 15 wherein said piston has a plurality of spaced apart inner channels extending threrethrough from a piston bottom to a piston top of said piston, the outer channels being positioned at said piston bottom relatively inwardly to said outer channels, said fluid flowing through said inner channels and said outer channels as said piston moves away from said inner chamber bottom as said assembly is moved towards said extended configuration and flowing through only said outer channels from said piston bottom, and thereby at a slower rate for facilitating dampening of said shocks, towards said aperture and said outer chamber by moving of said piston towards said inner chamber bottom as said assembly moves towards said refracted position.

17. The device of claim 16 wherein said inner channels extend threrethrough said piston and are slanted outwardly from the piston bottom to the piston top, each said outer channel extending from said piston bottom inwardly to one of said inner channels.

18. The device of claim 16, further comprising a flexible valve of flexible and impermeable material, said valve being mounted on said piston bottom and extending thereacross between inner channel bottom ends of said inner channels and said outer channels at said piston bottom, said flexible valve being pushed against said piston bottom and covering said inner channel bottom ends, thereby preventing said fluid from flowing through from said inner channel ends as said piston moves towards said inner chamber bottom and said assembly moves towards said retracted configuration, said flexible valve being pushed away from said piston bottom and said inner channel openings, thereby allowing said fluid to flow from said piston bottom through said inner channels and outer channels, by said fluid as said piston moves away from said inner chamber bottom and said assembly moves towards said extended configuration.

19. The device of claim 14, further comprising an annular piston extending sealingly across said outer chamber, from an inner side wall of said outer chamber, opposite said inner chamber side wall and through which said aperture extends, to an outer side wall of said outer chamber, said annular piston being axially movable within said outer chamber relative said axis, said outer chamber containing a quantity of compressed air at low pressure between said annular piston and an outer chamber bottom proximal said cylinder bottom end and said outer chamber being filled by said fluid between said annular piston and an upper chamber top opposite said upper chamber bottom, said fluid being forced through said piston towards said aperture into said outer chamber by the piston moving towards said inner chamber bottom for said retracted configuration and forcing the annular cylinder to move towards said cylinder bottom end and compressing the air to a higher pressure, said air at said higher pressure creating resistance to, and thereby slowing, movement towards said retracted configuration to facilitate dampening of said shocks, said air at said higher pressure pushing said annular piston back towards said inner chamber bottom as said piston is moved back towards said extended configuration, thereby facilitating moving of assembly back towards said extended configuration, said air being decompressed towards said low pressure by said movement of said annular cylinder towards said outer cylinder top as said assembly moves towards said extended configuration.

20. The device of claim 1, wherein said housing, said threaded rod, said cylinder, and said piston rod are sized and shaped for containing of said cylinder within said housing with a bottom connector extending out of said housing when said device is in the lowered configuration with said assembly in the retracted configuration and for containing said threaded screw and said cylinder top end in said housing when said device is in said raised configuration and said assembly is in said extended configuration.

* * * * *